United States Patent [19]
Reichl

[11] Patent Number: 5,365,168
[45] Date of Patent: Nov. 15, 1994

[54] MEASURING INSTRUMENT FOR CONTACTLESS DETERMINATION OF AN ANGLE OF ROTATION OF AN ADJUSTING SHAFT

[75] Inventor: Asta Reichl, Stuttgart, Germany

[73] Assignee: Robert Bosch GmbH, Stuttgart, Germany

[21] Appl. No.: 30,958

[22] Filed: Mar. 12, 1993

[30] Foreign Application Priority Data

Apr. 7, 1992 [DE] Germany .............................. 4211616

[51] Int. Cl.$^5$ .......................... G01B 7/30; F02D 9/08
[52] U.S. Cl. ........................ 324/207.16; 324/207.19; 324/207.22; 324/207.25; 123/617
[58] Field of Search ........... 324/164, 173, 174, 207.13, 324/207.15, 207.16, 207.17, 207.18, 207.19, 207.22, 207.25; 123/617

[56] References Cited

U.S. PATENT DOCUMENTS 5,027,067  6/1991  Witzig .
5,126,665  6/1992  Hachtel et al. ............ 324/207.25 X

FOREIGN PATENT DOCUMENTS 3976864  11/1990  Germany .

Primary Examiner—Gerard R. Strecker
Attorney, Agent, or Firm—Edwin E. Greigg; Ronald E. Greigg

[57] ABSTRACT

A measuring instrument for contactless determination of an angle of rotation of an adjusting shaft. To avert transmitting a tumbling motion from the adjusting shaft to the measuring instrument, a coupling body is provided, which with engagement protrusions, engages engagement grooves of a driver body with play. The driver body actuating the measuring ring is as a result decoupled from tumbling motion effected by the adjusting shaft. The measuring instrument is especially suitable for contactless determination of the angle of rotation of a throttle device in an internal combustion engine.

18 Claims, 3 Drawing Sheets

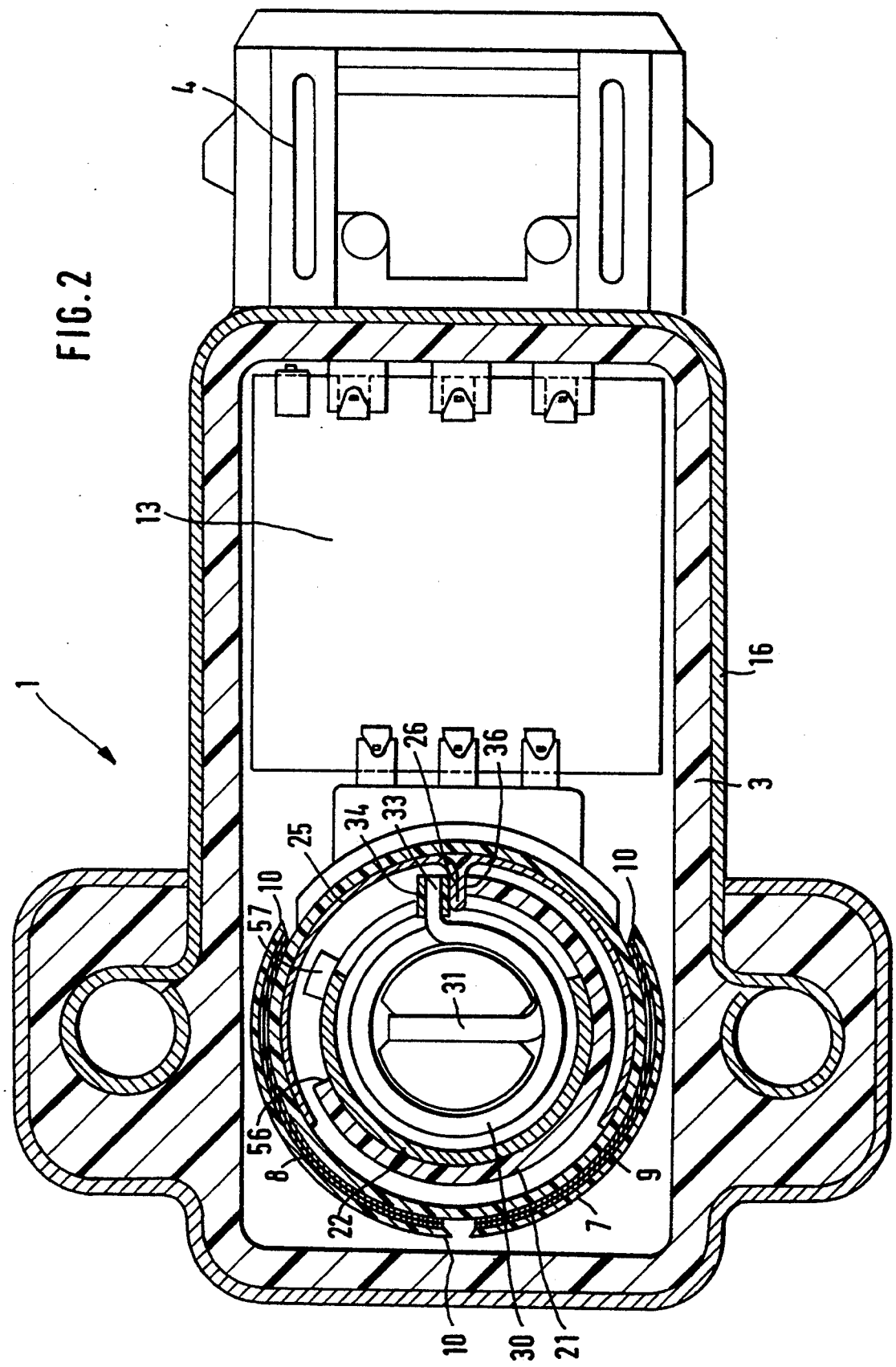

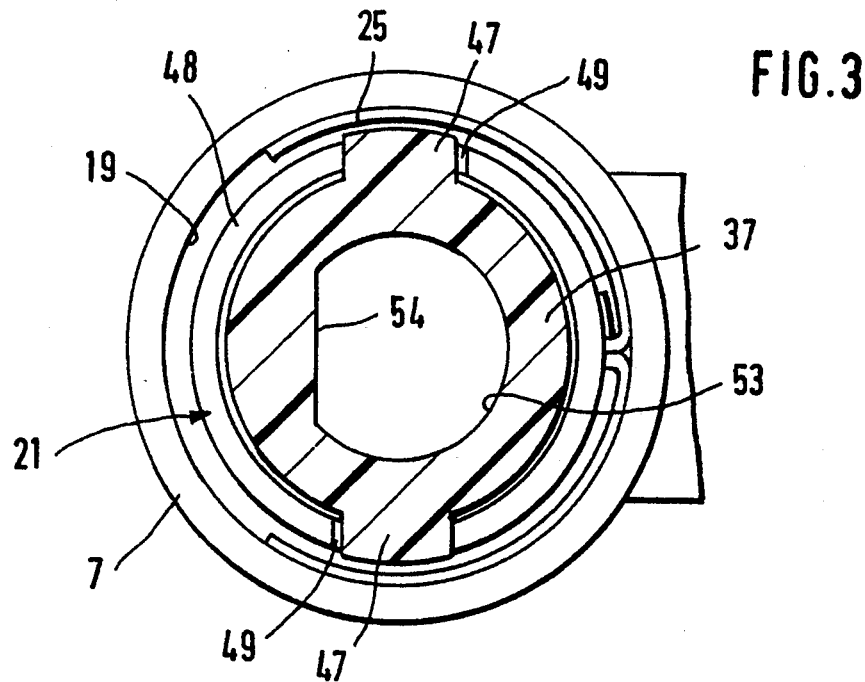
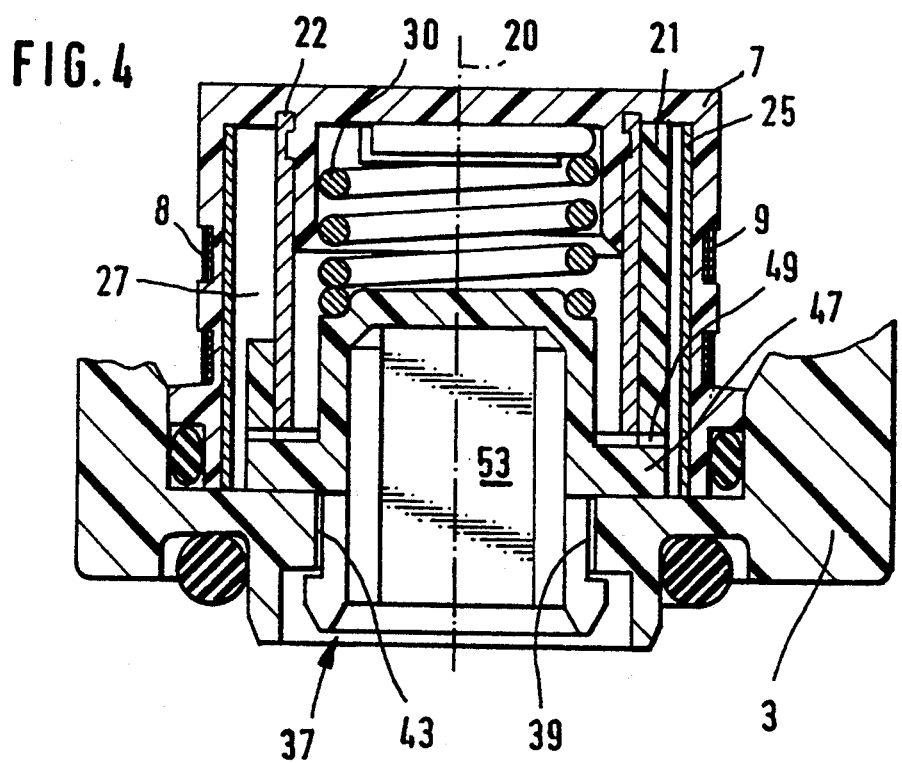

MEASURING INSTRUMENT FOR CONTACTLESS DETERMINATION OF AN ANGLE OF ROTATION OF AN ADJUSTING SHAFT

BACKGROUND OF THE INVENTION

The invention is based on a measuring instrument for determining an angle of rotation of a device as defined hereinafter. In a known measuring instrument of this type (German Offenlegungsschrift 39 16 864), U.S. Pat. No. 5,027,067, the coil body is slit on its end, which creates two semicircular cores. One sensor coil is wound onto each of these cores which are surrounded by a sleeve body. The sleeve body either has a slit or has a zone of electrically nonconducting material. Since the measuring instrument operates by the so-called eddy current principle, tumbling motions that change the spacing between the coil and the inside of the sleeve body can adulterate the measurement signal. This worsens both the accuracy of the measurement signal and the detection of the angle of rotation.

OBJECT AND SUMMARY OF THE INVENTION

The measuring instrument according to the invention has an advantage that a measurement signal of relatively high accuracy is obtained, since the transmission of tumbling motions to the parts of the measuring instrument that produce the measurement signal is avoided. The measurement signal is completely independent of bearing play and of any eccentricity in the adjusting shaft relative to the measuring instrument.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 is a section taken along the line II—II of FIG. 1;

FIG. 3 is a section taken along the line III—III of FIG. 1; and

FIG. 4 is a section taken along the line IV—IV of FIG. 1.

DESCRIPTION OF THE PREFERRED EMBODIMENT

Figure 1:
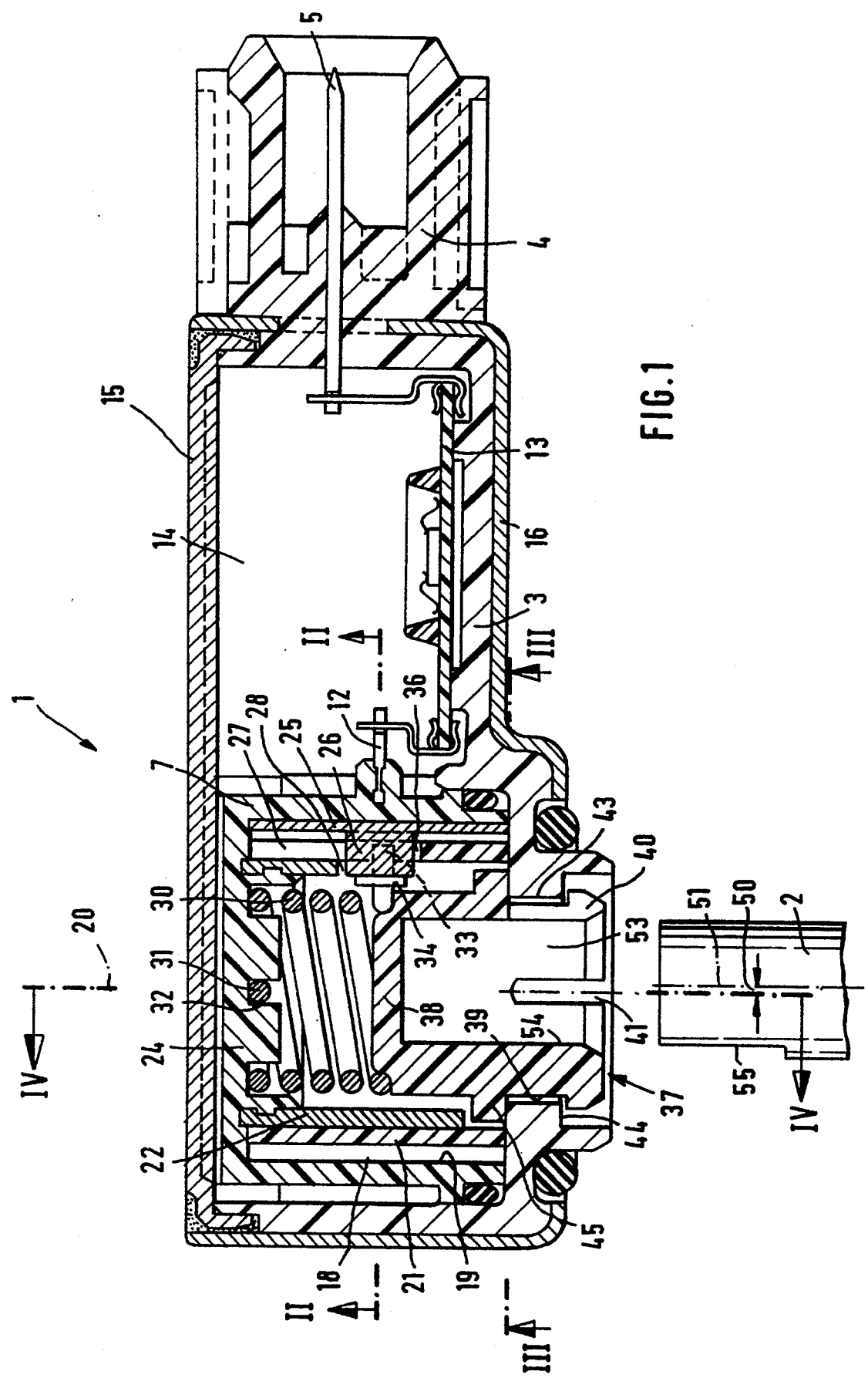
FIG. 1 is a longitudinal section through a measuring instrument embodied according to the invention.

FIGS. 1–4 show a measuring instrument 1, which for determining an angle of rotation serves as a throttle device position transducer, for example. A throttle device position transducer measures the swiveled position of the throttle device disposed in the air intake tube of an internal combustion engine; the throttle device is joined to an adjusting shaft 2 in a manner fixed against relative rotation and thus outputs an electrical output signal that corresponds to the angle of rotation or swiveling of the throttle device out of its position of repose; the throttle device is embodied as a throttle valve, by way of example. The manner in which an electrical output is obtained will be set forth hereinafter.

The measuring instrument 1 has a housing 3, which has an integrated plug housing 4 for electrical plug-type contacts 5 on one side. A cup-shaped coil body 7 is inserted into the housing 3, and two sensor coils 8 and 9 are disposed on the outside wall of the coil body, each covering an angular range of approximately 120°. The two sensor coils 8 and 9 are rectangular in shape, which means that if wire coils are used, the wire is wound around two hooks 10. This produces two coil lengths extending over the aforementioned angular range of approximately 120°, and one of each of these lengths is visible in FIG. 2. Flat coils that are adhesively connected to the wall of the coil body 7 or are applied by thick-film technology prove to be especially favorable here. Both sensor coils 8 and 9 are connected in a manner not shown in detail, with the aid of electrically conductive connecting lengths 12, to the electrical components of an electrical circuit panel 13, which is electrically connected with the plug-type contacts 5. The electric circuit panel 13 is disposed in a chamber 14 of the housing 3. A lid 15 is mounted on the housing 3 in a sealed manner. To protect it from electromagnetic radiation, the housing 3 is surrounded by a shielding cup 16, which is produced from steel, aluminum, or bronze, for instance.

The coil housing 7 has a cylindrical opening 18 that is defined by an inner wall 19. A sleevelike driver body 21 is guided on the inner wall 19 by a sleevelike guide body 22. The sleevelike guide body 22 is rotatably held in the coil body 7, concentrically with a sensor axis 20 and radially spaced apart from the inner wall 19 of the coil body 7. The driver body 21 is produced from electrically nonconducting and nonmagnetic material, such as plastic, and is radially guided by the metal guide body 22 anchored in the bottom 24 of the coil body 7.

A measurement portion of a ring 25, acting as a first body, rests with tension on the inner wall 19 of the coil body 7, spaced apart from the driver body 21, and extends circumferentially over approximately 240°. The measuring ring 25 comprises electrically conducting material and/or ferromagnetic material and has a crimp 26 approximately in the middle, extending radially inward into the opening 18. The crimp 26 extends through a recess 27 in the driver body 21 that extends over approximately 100° in the circumferential direction of the driver body 21. The two sensor coils 8 and 9 are relatively close together at their ends at the circumference of the coil body 7, while the other ends are relatively far apart, approximately 100° away from one another. The guide body 22 is provided with an opening 28, into which the crimp 26 of the measuring ring 25 also protrudes, the opening corresponding approximately to the circumferential range over which the two sensor coils 8 and 9 are maximally spaced apart from one another.

A helical spring 30 rests on the bottom 24 of the coil body 7, engaging a retaining groove 32 of the bottom 24 with one bent end 31 and thus being secured against relative rotation. The spring 30, which extends axially away from the bottom 24 inside the guide body 22 also has an actuation end 33, which extends radially to beyond the crimp 26. A plastic slide body 34, is mounted on the activation end 33 by means of which the actuation end 33 engages the crimp 26 and thus the measuring ring 25. The recess 27 of the driver body 21 is defined by a bearing face 36 extending axially. By means of the slide body 34, the spring 30 engages the crimp 26 of the measuring ring 25 in such a way that the side of the crimp 26 located opposite the slide body 34 is always retained free of play on the bearing surface 36 of the driver body 21.

A cup-shaped coupling body 37 protrudes with radial spacing into the interior of the guide body 22 in such a way that a shoulder 38 engages the inside of the last winding of the spring 30, facing it which guides the coupling body. Remote from the spring 30, the circumference of the coupling body 37 has an annular groove 39, which is defined toward the outside by an annular detent protrusion 40. Axial grooves 41 in the coupling body 37 that extend from the annular detent protrusion 40 to the annular groove 39 enable a radial compression of the coupling body 37 in the region of the annular groove 39 and detent protrusion 40, so that the detent protrusion 40 can be thrust through a detent opening 43 in the housing 3, until the annular groove 39 and the detent opening 43 are opposite one another. The detent protrusion 40 fits radially over a detent collar 44 provided on the outside of the housing 3. Remote from the detent protrusion 40 the annular groove 39 is defined by a collar 45, which likewise protrudes radially beyond the detent opening 43 of the housing 3 and has play in the radial direction relative to the inner wall of the driver body 21.

As shown more clearly in FIG. 3, at least one engagement protrusion 47, embodied as a protuberance, extends radially, beginning at the collar 45. In the exemplary embodiment, two engagement protrusions 47 are formed on the coupling body 37. The engagement protrusions 47 protrude radially beyond one face end 48 of the driver body 21. Beginning at the face end 48 of the driver body 21, engagement grooves 49, embodied as indentations, are provided in the driver body 21, corresponding to the engagement protrusions 47, so that the engagement protrusions 47 engage the corresponding engagement grooves 49. If only one engagement protrusion 47 is formed on the coupling body 37, then accordingly only one engagement groove 49 is formed on the driver body 21. The number of engagement grooves 49 corresponds to the number of engagement protrusions 47 in each case. In a manner not shown, the disposition of the engagement protrusions and grooves can be transposed, so that the protrusions are formed on the driver body 21 and the grooves on the coupling body 37. In the circumferential direction, the width of the engagement protrusions 47 is selected such that they are narrower than the engagement grooves 49 in the circumferential direction. As a result, the engagement protrusions 47 can move with play inside the engagement grooves 49 in the circumferential direction. In the axial direction as well, each engagement groove 49 is deeper than the engagement protrusions 47 are wide in the axial direction. This prevents the transmission of a tumbling motion of the coupling body 37, which occurs in the direction of the sensor axis 20 or transversely to it, to the driver body 21, since in each case the tumbling motion is compensated for by the play between the engagement protrusions 47 and the engagement grooves 49. Such a tumbling motion can be brought about by the bearing play of the adjusting shaft 2 or by an eccentricity 50 between the sensor axis 20 and the adjusting shaft axis 51.

To receive the adjusting shaft 2, a coupling opening 53, which has a flattened portion 54, is embodied in the coupling body 37. When the adjusting shaft 2 is inserted into the coupling opening 53, a flattened side 55 of the shaft comes to rest against the flattened portion 54, thereby producing a torsion-proof coupling between the adjusting shaft 2 and the coupling body 37.

In the outset position of the measuring instrument, the driver body 21 and the measuring ring 25 are rotated clockwise by the spring force of the spring 30, via the crimp 26 resting on the bearing face 36, far enough that a stop face 56 of the driver body 21, which likewise defines the recess 27 in the axial direction, comes to rest on a stop 57, which may be formed on the body 7. Beginning at the outset position of the measuring instrument 1, in which the driver body 21 rests on the stop 57, a counterclockwise rotary motion can now be transmitted by the adjusting shaft 2 to the measuring ring 25 via the coupling body 37 and the driver body 21; the angular position of the adjusting shaft 2 and thus of the measuring ring 25 at a given time can be picked up as a measurement signal at the plug-type contacts 5. In FIGS. 1-4, the movable parts of the measuring instrument 1 are shown approximately in their middle measuring position. If the adjusting shaft 2 moves clockwise out of this middle position, then the spring force of the spring 30 causes the measuring ring 25 to track it without play, again in the clockwise direction.

The measuring instrument 1 may operate by the inductive measuring principle and/or by the eddy current principle; in both cases, an alternating current flows through the sensor coils 8 and 9. For measurement, the measuring ring 25 is rotated about the sensor axis 20, via the adjusting shaft 2 that is connected to the throttle device and via the coupling body 37 and the driver body 21, the rotation being guided by the inner wall 19 of the coil body 7; as a result, the relative position of the coil body 7 having the sensor coils 8 and 9 and acting as a second body varies relative to the measuring ring.

The production of a measurement signal using the eddy current principle will now be explained.

An alternating current, particularly a high-frequency alternating current, flows through the sensor coils 8 and 9. This creates a magnetic alternating field at the sensor coils 8 and 9, which causes eddy currents on the metal surface of the measuring ring 25. The greater the area 25 penetrated by the magnetic field, the larger are the eddy currents that are produced. Moreover, the size and the depth of the eddy currents depends on the material used for the measuring ring 25 and on the spacing of the individual sensor coils 8 and 9 from the surface of the measuring ring 25. By means of the eddy current, generated on the measuring ring 25, the alternating current resistance of the two sensor coils 8 and 9 upon a rotary motion of the measuring ring 25 is varied, which is utilized for obtaining a measurement signal. Since the inductance of the sensor coils 8 and 9 varies as well, this change in inductance can also be utilized for obtaining a measurement signal (this is known as the coil inductance evaluation method). Upon the rotary motion of the measuring ring 25, the surface area of the measuring ring 25 associated with each sensor coil 8 and 9 varies inversely. As a result, the surface area of the measuring ring 25 oriented toward one sensor coil 8 is for instance increased by the same amount that the surface area of the measuring ring 25 oriented toward the other sensor coil 9 is decreased. In the method that evaluates the coil alternating current resistance, for instance, the two sensor coils 8 and 9 are wired together in a Wheatstone half-bridge circuit. As a result, the measurement errors that occur simultaneously in the sensor coils 8 and 9 and that act inversely compensate for one another. In particular, by means of this connection of the sensor coils 8 and 9, errors from temperature fluctuations, for instance, can be compensated for.

Instead of the eddy current principle described above, the inductive measuring method can logically also be employed.

In that case, the measuring ring 25, on the surface toward the sensor coils 8 and 9, need merely comprise ferromagnetic material. To that end, the entire measuring ring 25 may be produced from ferromagnetic material, or it may have a ferromagnetic coating. In contrast to the eddy current principle, the penetration depth of the electromagnetic alternating field of the sensor coils 8 and 9 is less. While in the eddy current principle the coil inductance is reduced, in the inductive method it can increase, as a function of the ferromagnetic and electrically conducting properties of the material (known as the ferromagnetic effect).

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A measuring instrument for the contactless determination of an angle of rotation of an adjusting shaft, said measuring instrument comprises a coil body (7) that surrounds a measuring ring (25) having a portion that extends circumferentially over an angle less than 360°, said coil body (7) and said measuring ring (25) are movable relative to each other, and at least one sensor coil is disposed on said coil body, an alternating current flows through said at least one sensor coil, whose inductance and alternating current resistance vary by rotation of said measuring ring as a result of a relative variation in a size of a region of said portion of said measuring ring, which is oriented toward the at least one sensor coil, said measuring ring comprises electrically conducting and/or ferromagnetic material, and wherein the adjusting shaft can be coupled to a coupling body, in which the coupling body (37) engages a driver body (21) said driver body (27) is disposed between said coupling body (37) and said measuring ring (25) and engages said measuring ring to rotate said measuring ring, and both the coupling body (37) and the driver body (21) have at least one protuberance (47) or an indentation (49), and the at least one protuberance (47) and indentation (49) engage one another with play.

2. A measuring instrument as defined by claim 1, in which at least one engagement protrusion (47) serves as the protuberance and at least one engagement groove (49) serves as the indentation.

3. A measuring instrument as defined by claim 2, in which the at least one engagement protrusion (47) is formed on the coupling body (37) and the at least one engagement groove (49) is formed on the driver body (21).

4. A measuring instrument as defined by claim 3, in which the at least one engagement protrusion (47) is disposed extending radially outward on the coupling body (37).

5. A measuring instrument as defined by claim 1, in which the driver body (21) is embodied in a sleeve-like fashion.

6. A measuring instrument as defined by claim 2, in which the driver body (21) is embodied in a sleeve-like fashion.

7. A measuring instrument as defined by claim 3, in which the driver body (21) is embodied in a sleeve-like fashion.

8. A measuring instrument as defined by claim 4, in which the driver body (21) is embodied in a sleeve-like fashion.

9. A measuring instrument as defined by claim 5, in which a spring (30) having an actuation end (33) engages the measuring ring (25), and its spring force keeps the measuring ring (25) in contact with the driver body (21).

10. A measuring instrument as defined by claim 6, in which a spring (30) having an actuation end (33) engages the measuring ring (25), and its spring force keeps the measuring ring (25) in contact with the driver body (21).

11. A measuring instrument as defined by claim 7, in which a spring (30) having an actuation end (33) engages the measuring ring (25), and its spring force keeps the measuring ring (25) in contact with the driver body (21).

12. A measuring instrument as defined by claim 8, in which a spring (30) having an actuation end (33) engages the measuring ring (25), and its spring force keeps the measuring ring (25) in contact with the driver body (21).

13. A measuring instrument as defined by claim 9, in which a slide body (34) made of plastic is disposed on the actuation end (33) of the spring (30) and engages the measuring ring (25).

14. A measuring instrument as defined by claim 10, in which a slide body (34) made of plastic is disposed on the actuation end (33) of the spring (30) and engages the measuring ring (25).

15. A measuring instrument as defined by claim 11, in which a slide body (34) made of plastic is disposed on the actuation end (33) of the spring (30) and engages the measuring ring (25).

16. A measuring instrument as defined by claim 12, in which a slide body (34) made of plastic is disposed on the actuation end (33) of the spring (30) and engages the measuring ring (25).

17. A measuring instrument as defined by claim 9, in which the rotary motion of the driver body (21) is limited by means of at least one stop (57).

18. A measuring instrument as defined by claim 9, in which a shielding, sleevelike guide body (22) is disposed between the at least one sensor coil (8, 9) and the spring (30) and is supported at the coil body (7).

* * * * *